United States Patent [19]
Bolen et al.

[11] Patent Number: 5,580,259
[45] Date of Patent: Dec. 3, 1996

[54] CLOCKSPRING WITH RESILIENT FLAT CABLE CARRIER APPARATUS

[75] Inventors: Patrick A. Bolen, Carthage; Kevin M. Thompson, Hamilton, both of Ill.

[73] Assignee: Methode Electronics, Inc., Chicago, Ill.

[21] Appl. No.: 386,560

[22] Filed: Feb. 10, 1995

[51] Int. Cl.$^6$ ........................................ H01R 3/00
[52] U.S. Cl. ................................. 439/164; 439/15
[58] Field of Search ................... 439/15, 164, 13

[56] References Cited

U.S. PATENT DOCUMENTS

| | | | |
|---|---|---|---|
| 3,763,455 | 10/1973 | Confer et al. | |
| 4,540,223 | 9/1985 | Schmerda et al. | |
| 4,978,191 | 12/1990 | Hasegawa et al. | 350/96.20 |
| 5,040,989 | 8/1991 | Bannai | 439/164 |
| 5,044,968 | 9/1991 | Bannai et al. | 439/164 |
| 5,046,951 | 9/1991 | Suzuki | 439/15 |
| 5,066,239 | 11/1991 | Bannai et al. | 439/164 |
| 5,082,451 | 1/1992 | Bannai et al. | 439/164 |
| 5,098,028 | 3/1992 | Ida et al. | 242/54 |
| 5,102,061 | 4/1992 | Suzuki et al. | 242/54 |
| 5,106,316 | 4/1992 | Bannai et al. | 439/164 |
| 5,149,273 | 9/1992 | Bannai et al. | 439/15 |
| 5,171,157 | 12/1992 | Bolen | 439/164 |
| 5,224,871 | 7/1993 | Ida et al. | 439/164 |
| 5,277,604 | 1/1994 | Ida et al. | 439/164 |
| 5,304,071 | 4/1994 | Bannai et al. | 439/164 |
| 5,409,389 | 4/1995 | Shibata et al. | 439/15 X |

FOREIGN PATENT DOCUMENTS

| | | |
|---|---|---|
| 186935A1 | 8/1985 | European Pat. Off. |
| 5-53184 | 7/1993 | Japan. |
| 5-226045 | 9/1993 | Japan. |
| 2233169 | 1/1990 | United Kingdom. |

*Primary Examiner*—Khiem Nguyen
*Attorney, Agent, or Firm*—David L. Newman

[57] ABSTRACT

A clockspring assembly having an apparatus for reducing the length of cable used in the clockspring's design. The clockspring has a housing which defines a first aperture. Rotatably mounted within the first aperture is a hub having a second aperture. Between the housing and the hub is a radial space defined within the housing. The radial space contains a ribbon cable which has a first end connected to a first connector and a second end connected to a second connector. Correspondingly, the first connector is attached to the housing and the second connector is attached to the hub. Furthermore, resiliently clamped onto the hub is a carrier apparatus which has a clamping portion for pressing the ribbon cable onto the hub during its rotation. In addition, the carrier apparatus also has a brace for reducing vibration of the portion of the cable portion which is not being pressed against the hub.

12 Claims, 2 Drawing Sheets

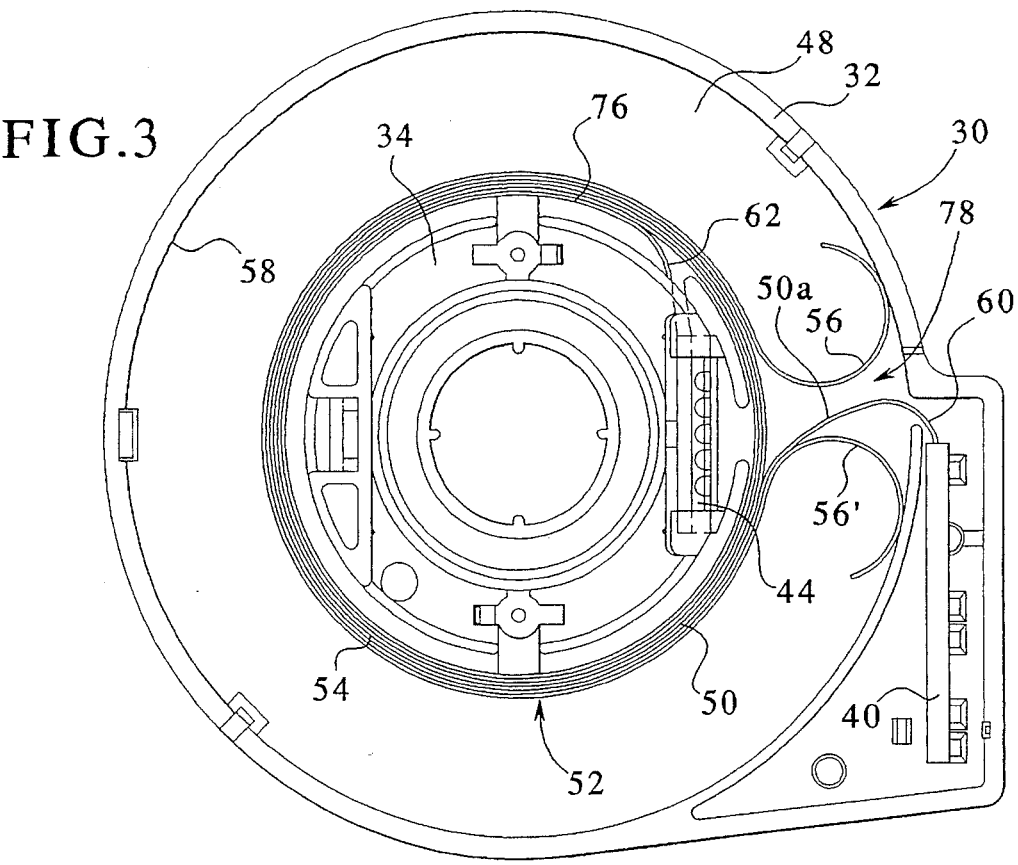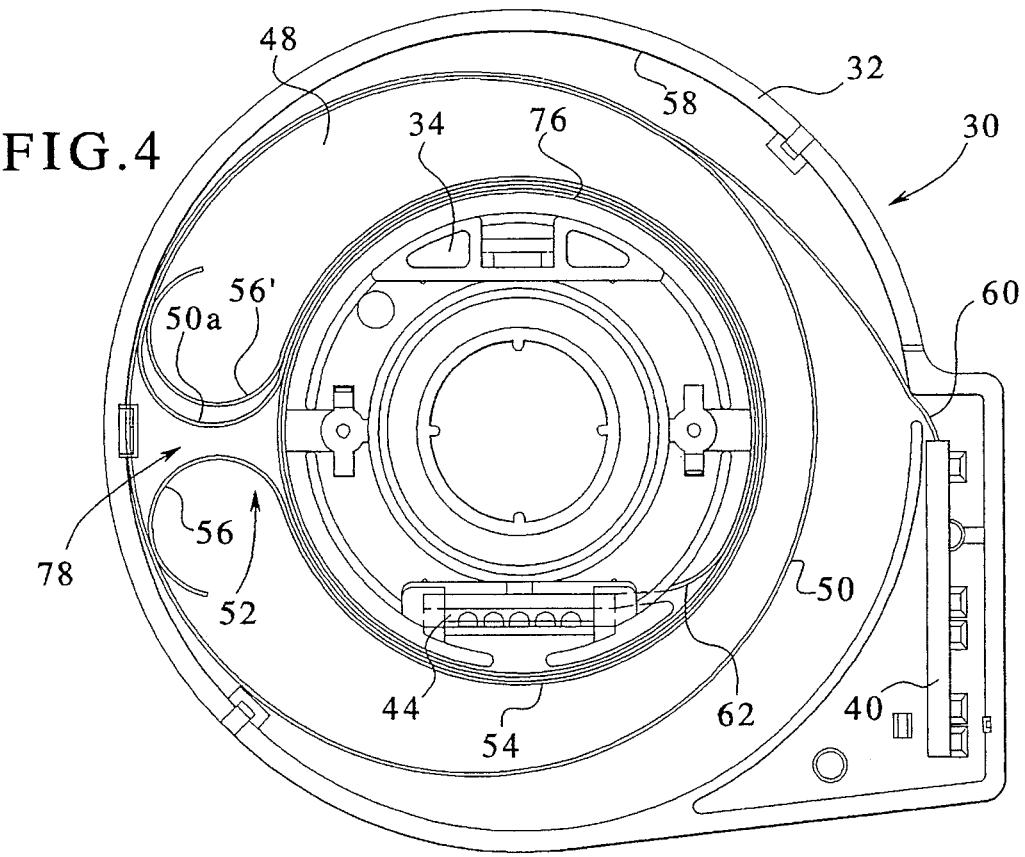

CLOCKSPRING WITH RESILIENT FLAT CABLE CARRIER APPARATUS

BACKGROUND OF THE INVENTION

The present invention relates to a clockspring assembly while electrically connects a stationary housing to a rotatable hub by means of a flat ribbon cable, and in particular to a resilient carrier apparatus which reduces the length of the flat cable used in the clockspring's design.

Clocksprings are typically used in applications such as connecting an air bag, mounted in the steering wheel of an automobile, to sensors mounted within various locations of the automobile.

For example, U.S. Pat. No. 5,061,195 (1991), issued to Bolen, discloses a type of clockspring which provides a direct electrical connection between relatively movable members in the steering apparatus of an automobile. In this type of clockspring construction, a ribbon cable is used to provide the electrical connection. The ribbon cable is constructed of conductive material which is sandwiched between two layers of mylar. The cable is loosely accommodated in a coiled state within the clockspring's housing. In addition, one end of the cable is attached to the clockspring's stationary member and the other end of the cable is attached to the clockspring's rotatable hub.

In operation, the ribbon cable will either wrap or unwrap around the hub when the hub is rotated. Correspondingly, the length of the cable determines how many times the hub can be rotated. However, a long cable length can result in a higher cost to assemble the clockspring. In addition, a longer cable length can cause the clockspring to have a larger overall mass. Also, a longer cable length can cause more vibration and noise to be generated as the cable is moved within the clockspring housing.

Many devices have been proposed in order to reduce the length of the cable used in the design of the clockspring. However, these devices are not capable of simultaneously and substantially reducing the cable length, the mass of the clockspring, and the level of vibration and noise generated by movement of the cable.

For example, it is known in the art to have a clockspring construction which decreases the length of cable needed because the cable has a U-shaped portion that will move at an angular speed which is less than that of the hub. It is also known to have a C-shaped carrier assembly which has rollers mounted thereon.

One problem with the prior art clocksprings is their inability to provide a means for effectively preventing vibration and noise from being generated by that portion of the cable which is not pressed against the hub. The loose portion of the cable will vibrate and generate noise unless it is made of sufficiently rigid material so that it effectively presses itself against the inner peripheral surface of the housing. However, such a rigid cable will cause the clockspring's reliability to be reduced due to the destructive flexing caused by the reversing of the cable's direction at the turned-back portion.

Likewise, the prior art clocksprings also fail to effectively press both of the carrier assembly's end rollers against the hub. The end rollers are the most critical in ensuring the effective securement of the cable to the hub. However, the carrier assembly's end rollers are secured only by the weak end portions of the C-shaped spring.

In addition, the prior art clocksprings also fail to significantly reduce the cost involved in the clockspring's manufacture. Although the clockspring design reduces the cable length, it also requires the additional expense of providing a carrier assembly consisting of a plurality of cylindrical units which have rollers and are interconnected via a wire spring.

Therefore, a clockspring assembly is proposed having a low cost resilient flat cable carrier apparatus which reduces the cable length and effectively prevents the cable from vibrating and generating noise.

In view of the above, it is an object of the present invention to provide a resilient flat cable carrier apparatus which reduces the necessary cable used to construct a clockspring assembly.

A further object of the present invention is to provide a resilient flat cable carrier apparatus which reduces the overall mass of a clockspring assembly.

An added object of the present invention is to provide a resilient flat cable carrier apparatus which reduces the manufacturing cost of a clockspring assembly.

It is also an object of the present invention is to provide a resilient flat cable carrier apparatus which reduces the vibration and noise generated by a clockspring assembly.

Another object of the present invention is to provide a resilient flat cable carrier apparatus which enhances the reliability of a clockspring assembly.

SUMMARY OF THE INVENTION

The present invention provides an apparatus for reducing the length of cable used in the design of a clockspring. To this end, in one form of the invention a clockspring is provided having a housing which defines a first aperture. Rotatably mounted within the first aperture is a hub having a second aperture. Between the housing and the hub is a radial space defined within the housing. The radial space contains a ribbon cable which has a first end connected to a first connector and a second end connected to a second connector. Correspondingly, the first connector is attached to the housing and the second connector is attached to the hub. Furthermore, resiliently clamped onto the hub is a carrier apparatus which has a clamping portion for pressing the ribbon cable onto the hub during its rotation. In addition, the carrier apparatus also has a brace for reducing vibration of the portion of the cable portion which is not being pressed against the hub.

The present invention further provides that the carrier apparatus may be comprised of a metal material, such as stainless steel, or a polymer material, such as Delrin 900. The carrier apparatus may also be laminated with polyester.

In addition, the present invention further provides that the carrier apparatus may have a roller attached which presses the ribbon cable against said housing.

In another form of the invention, a carrier apparatus is provided which installs within a clockspring having a hub, a housing, and a ribbon cable connected to the hub and the housing. The carrier apparatus has both a resilient clamping portion secured to the hub and a brace extending from the resilient clamping portion for pressing the ribbon cable against the housing.

The present invention further provides that the carrier apparatus may be comprised of a unitary member.

Various means for practicing the invention and other advantages and novel features thereof will be apparent from the following detailed description of an illustrative preferred embodiment of the invention.

BRIEF DESCRIPTION OF THE DRAWINGS

There is shown in the drawings a presently preferred embodiment of the present invention, wherein like numerals in the various figures pertain to like elements, and wherein:

FIG. 3 is a plan view of the clockspring assembly of FIG. 2 with the clockspring's top being omitted and the clockspring being wound to its full clockwise position;

FIG. 4 is a plan view of the clockspring assembly of FIG. 2 with the clockspring's top being omitted and the clockspring being wound to its center position;

DETAILED DESCRIPTION OF THE PRESENTLY PREFERRED EMBODIMENTS

Figure 1:
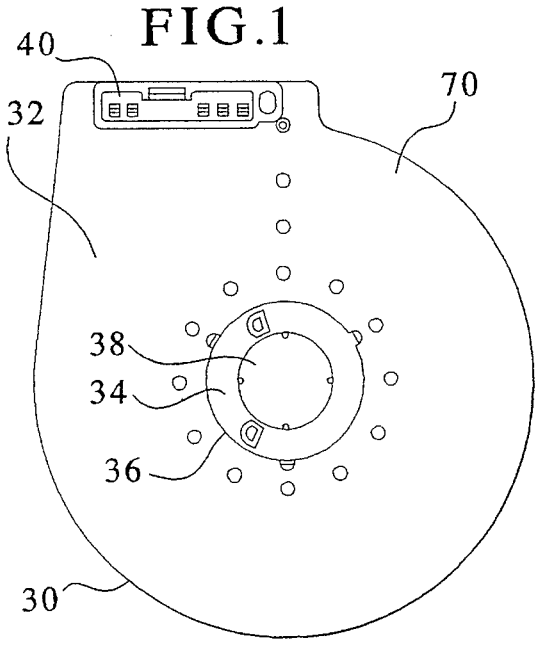
FIG. 1 is a bottom view of a clockspring assembly utilizing the present invention.
Figure 2:
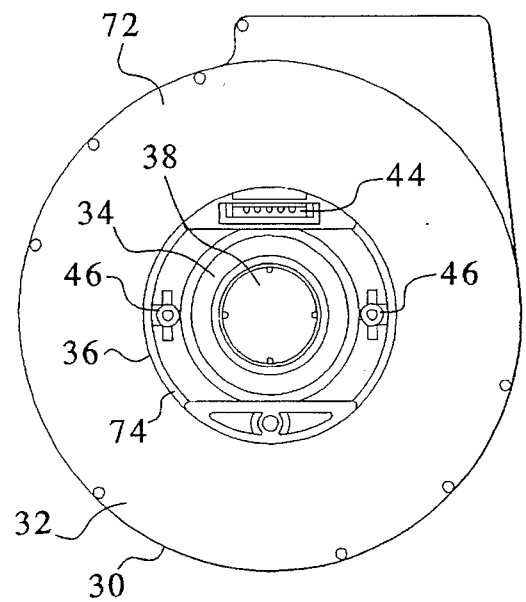
FIG. 2 is a plan view of the clockspring assembly depicted in FIG. 1.

Referring to the drawings, and particularly to FIGS. 1 and 2, a bottom and plan view, respectively, is depicted of a clockspring assembly 30 utilizing the present invention. In the preferred embodiment, the clockspring assembly 30 includes a housing 32 and a hub 34. The housing 32 has a first aperture 36 while the hub 34 has a second aperture 38. Furthermore, the housing 30 includes a first connector 40 and the hub 34 includes a second connector 44.

The clockspring's hub 34 may also include one or more spring loaded locking devices 46 as described by U.S. Pat. 5,171,157 (1992), issued to Bolen, which is incorporated herein by reference.

Figure 5:
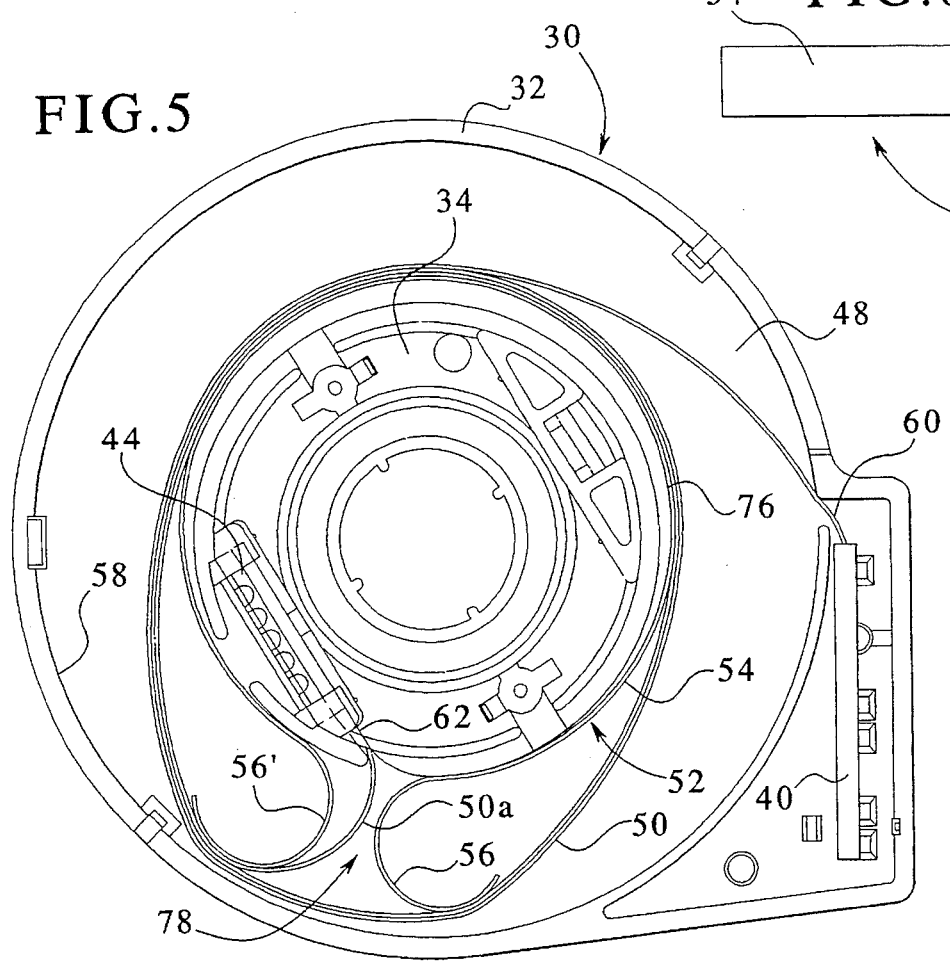
FIG. 5 is a plan view of the clockspring assembly of FIG. 2 with the clockspring's top being omitted and the clockspring being wound to its full counterclockwise position.

Referring to FIGS. 3, 4, and 5, a plan view of the clockspring assembly 30 is depicted with the clockspring's top being omitted. FIG. 3 shows the clockspring assembly 30 being wound to its full clockwise position. Likewise, FIG. 4 depicts the clockspring assembly 30 being wound to its center position. Furthermore, FIG. 5 depicts the clockspring assembly 30 being wound to its full counterclockwise direction. FIGS. 3, 4, and 5 will be discussed, in detail, below.

The housing 32 and the hub 34 combine to define the body of the clockspring assembly 30. The clockspring assembly 30 has a radial space 48 which is defined by the combination of the hub 34 and housing 32. Located in the radial space 48 and around the hub 34 is a flat ribbon cable 50.

The preferred embodiment of the clockspring assembly 30 also includes a resilient flat cable carrier apparatus 52 which is positioned within the clockspring's radial space 48 and surrounds the hub 34. The carrier apparatus 52 includes a clamping portion 54 which is generally C-shaped and resiliently clamps around the hub 34. On each end of the carrier apparatus 52 is a brace 56,56'. Each brace 56 is generally C-shaped and extends from the clamping portion 54 of the carrier apparatus 52. In an embodiment, each brace 56 may extend from the carrier apparatus and resiliently press against the housing's radial wall 58 which borders the radial space 48. However, in an alternative embodiment, each brace 56 may only extend approximately eighty percent of the distance between the hub 34 and the housing 32.

Figure 6:
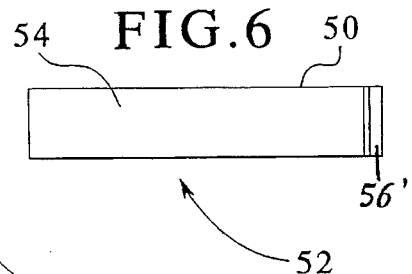
FIG. 6 is a side view of a resilient flat cable carrier apparatus which is detached from the hub of the clockspring assembly.

Turning to FIG. 6, a side view of the carrier apparatus 52 is depicted with the carrier being detached from the hub of the clockspring. The carrier apparatus 52 can either be made of a metal material, such as stainless steel which may be laminated with polyester, or made of a polymer material such as Delrin 900. Furthermore, all surface areas of the carrier member which come into contact with the ribbon cable 50 should be polished.

Referring back to the flat ribbon cable 50 depicted in FIGS. 3, 4, and 5, the cable may have more than one flexible conductor located therein. The multiple conductors are generally parallel to one another and are arranged in a plane curving about the hub 34. Each conductor within the flexible cable 50 may be comprised of coiled metal foil, a coiled wire, or any other coiled or resilient conducting means such as copper. Furthermore, the ribbon cable 50 may be fabricated by sandwiching the conductors between laminates of plastic material such as Kevlar or Mylar. In addition, the ribbon cable 50 may be fabricated so that the opposite sides of the cable are of different plastic material to reduce friction and prevent noise when the spiral wound cable is rotated. Alternatively, one face of the ribbon cable 50 may be fabricated with a glossy finish and the opposite face with a matte finish to achieve the same reduction in friction and noise.

The flat ribbon cable 50 has both a first end 60 and a second end 62. Correspondingly, the first end 60 of the cable 50 is conductively attached to the first connector 40 which is integral to the housing 32. Likewise, the second end 62 of the cable 50 is attached to the second connector 44 which is integral to the hub 34 of the clockspring assembly 30. Any method known in the art such as welding, soldering and the like may be utilized to attach the first end 60 and the second end 62 of the ribbon cable 50 to the first connector 40 and the second connector 44 so that the ribbon cable will maintain an electrical connection between the connectors.

Referring back to FIG. 1 and 2, the clockspring's housing 32 has both a base portion 70 and a top cover portion 72. The top cover portion 72 is attached to the base portion 70 by an attaching means such as a screw, and epoxy material or any other attaching means.

Protruding from the outside of the housing 32 is the first connector 40. The purpose of the first connector 40 is to provide a location at which an external conducting means such as a wire, plug, a harness or some other conducting means can be attached to the housing 32 and subsequently attached to the first end 60 of the flat ribbon cable 50. Preferably, the first connector 40 is an integral connector which contains one or more male or female plugs for uniting the clockspring assembly housing 32 with an external connector. The external connector would typically unite the clockspring assembly 30 with sensors, an electronic signal device, or some other device which is intended to convey an electrical signal to a rotating device connected to the hub 34.

The preferred embodiment requires the hub 34 to be rotatably attached to the housing 32 in the proximity of the first aperture 36 of the housing 32. In addition, the hub 34 is located around the periphery of the first aperture 36 and held between the base portion 70 and the top cover portion 72 of the housing 32. The hub 34 contacts the base portion 70 and the top cover portion 72 of the housing 32 when it is rotating. Furthermore, a raised edge 74 on the hub 34 contacts the first aperture 36 in the top cover portion 72 which prevents the hub 34 from moving laterally about the housing 34.

Extending from the hub 34 is the second connector 44. Like the first connector 40, the second connector 44 may be a wire which passes through the hub 34, it may be a plug-type connection, or it may be any other connector which is capable of conductively coupling a sensing device or some other device which is in a stationary position, to a rotating device. Additionally, the first and second connectors 40 and 44 may comprise more than one connector integral to the hub 34 or the housing It is preferred that the ribbon cable 50 be long enough to allow the hub 34 to rotate at least two complete turns in any direction from a center rotational position while also maintaining conductance between the first and second connectors 40 and 44. Preferably, the ribbon cable 50 should be about three feet in length.

Referring to FIG. 4, the flat ribbon cable 50 extends from the second connector 44 and is wound counterclockwise along the outer radial wall 76 of the hub 34. Surrounding both the hub 34 and the portion of the ribbon cable 50 which is wrapped around the hub is the carrier apparatus 52. The portion of the ribbon cable 50 which extends from the hub 34 continues through the opening 78 in the C-shaped clamping portion 54 of the carrier apparatus 52 and is turned around in a U-like shape, referred to as a turned-back portion 50a, near brace 56'. The ribbon cable 50 is further wound clockwise within the clockspring's radial space 48 and finally attaches to the first connector 40.

In the preferred embodiment, the clockspring 30 is typically attached to a rotating device, which passes through the hub's second aperture 38, and to a stationary column which securely holds the clockspring's housing 32. The interconnection between the rotating device and the hub 34 allows the hub to be rotated in conjunction with the movement of the rotating device. Moreover, the rotating device is electrically connected to the hub 34 at the second connector 44. Therefore, when the rotating device is rotated, the hub 34 is also able to rotate and maintain an electrical connection with the rotating device.

Correspondingly, the housing 32 of the clockspring assembly 30 will remain stationary as the rotating device moves. For example, if the clockspring assembly 30 is attached to an automobile steering wheel column, the steering wheel will rotate while the housing 32 remains stationary on the column.

Furthermore, an electrical signal reaches the steering wheel by passing from the first connector 40, through the flat ribbon cable 50, and to the second connector 44 which is electrically attached to the steering wheel and may contain a device such as an airbag.

The detailed operation of the clockspring 30 in accordance with the embodiment described above will now be explained where, as stated above, the housing 32 is used as a fixed member and the hub 34 is employed as a moveable member. In FIG. 3, the clockspring assembly 30 is shown being wound to its full clockwise position with the majority of the ribbon cable 50 being wound around the hub 34. As the hub 34 is rotated counterclockwise by a rotational quantity, the portion of the ribbon cable 50 which is wound around the hub 34 will be precluded from expanding away from the hub because of the pressure applied by the clamping portion 54 of the carrier apparatus 52. In the preferred embodiment, the carrier apparatus 52 is formed having an inner diameter which is approximately equal to the outer diameter of the hub 34 plus two wraps of the ribbon cable 50 which is approximately 0.100 inch. However, a portion of ribbon cable 50 will be led out of the carrier apparatus' opening 78 which corresponds in length to the rotation quantity in which the hub 34 was rotated.

Since the potion of the ribbon cable 50 which is led out of the carrier apparatus' opening 78 is turned-back, it follows that the turned-back portion 50a of the ribbon cable 50 will move counterclockwise by a rotational quantity which is smaller than that of the hub 34. Furthermore, the carrier apparatus 52 will be forced to slide over the portion of the cable 50 which is wrapped about the hub 34 because the carrier's brace 56' will abut against the turned-back portion 50a of the cable.

As the hub 34 continues to rotate in the counterclockwise direction, the clockspring 30 will pass through its center position depicted in FIG. 4. At the centered position, the hub 34 has rotated approximately two and three-quarter turns and approximately half of the ribbon cable's length will be occupied within the radial space 48.

As the hub continues its rotation in the counterclockwise direction, the clockspring 30 will finally be wound to its full counterclockwise position shown in FIG. 5. As the clockspring is wound into its full counterclockwise position, the carrier apparatus 52 will become compressed due to the majority of the ribbon cable 50 becoming wrapped around it. Moreover, the carrier apparatus' braces 56 and 56' will be further withdrawn from the housing's radial wall due to the tension of the ribbon cable 50.

Conversely, when the hub 34 is rotated clockwise from the state shown in FIG. 5, the tension in the ribbon cable 50 will be released. Once the carrier apparatus 52 is no longer in a compressed state, a portion of the ribbon cable 50 will be drawn into the carrier apparatus' opening 78. The portion of cable drawn into the carrier opening 78 will have a length which corresponds to the rotational quantity in which the hub 34 is being rotated. However, as previously stated, since the portion of the ribbon cable 50 which is drawn into the carrier apparatus' opening 78 is turned-back, it follows that the turned-back portion of the ribbon cable 50 will move clockwise by a rotational quantity which is smaller than that of the hub 34.

As the ribbon cable 50 becomes wrapped around the hub 34, the cable will be precluded from expanding away from the hub due to the pressure applied by the clamping potion 54 of the carrier apparatus 52. Furthermore, the carrier apparatus 52 will slide over the potion of the cable 50 which is wrapped about the hub 34 because the carrier's brace 56 will abut against the turned-back portion 50a of the cable.

In a clockspring built in accordance with the above, it was observed that approximately seven and one-half complete hub rotations were possible with only three feet of cable and the hub having a diameter of two and one-quarter inches. In addition, a hub rotation of approximately two and one-half turns resulted In only one rotation of the carrier apparatus.

It should be understood that various changes and modifications to the presently preferred embodiments described herein will be apparent to those skilled in the art. Such changes and modifications may be made without departing from the spirit and scope of the present invention and without diminishing its attendant advantages. It is, therefore, intended that such changes and modifications be covered by the appended claims.

I claim:

1. A clockspring assembly comprising:

a) a housing;

b) a first connector attached to said housing;

c) a hub being carried in rotatable relation to said housing and defining a radial space between said housing and said hub;

d) a second connector attached to said hub;

e) a ribbon cable carried in said radial space and having a first end connected to said first connector and a second end connected to said second connector; and f) a carrier apparatus, resiliently clamped onto said hub, said carrier apparatus formed of a flat resilient material having a clamping portion for pressing said ribbon cable against said hub during rotation of said hub and said carrier apparatus having an integral semi-circular shaped brace for reducing vibration of said cable portion which is not being pressed against said hub.

2. The clockspring assembly of claim 1, wherein said carrier apparatus is comprised of a metal material.

3. The clockspring assembly of claim 2, wherein said metal material consists of stainless steel.

4. The clockspring assembly of claim 2, wherein said carrier apparatus is laminated with polyester.

5. The clockspring assembly of claim 1, wherein said carrier apparatus is comprised of a polymer material.

6. A carrier apparatus which installs within a clockspring having a hub, a housing, and a ribbon cable connected to said hub and said housing, said carrier apparatus formed entirely of a one-piece flat resilient material comprising:

a) a resilient clamping portion secured to said hub for pressing the ribbon cable against the hub; and b) an integral terminal portion forming a semi-circular shaped brace extending from said resilient clamping portion for guiding a turned-back portion of said cable.

7. The clockspring assembly of claim 6, wherein said carrier apparatus consists of a unitary member comprised of metal.

8. The clockspring assembly of claim 7, wherein said metal material consists of stainless steel.

9. The clockspring assembly of claim 7, wherein said carrier apparatus is laminated with polyester.

10. The clockspring assembly of claim 6, wherein said carrier apparatus consists of a unitary member comprised of a polymer material.

11. A clockspring assembly comprising:

a) a housing;

b) a first connector attached to said housing;

c) a hub being carried in rotatable relation in said housing and defining a radial space within said housing and between said housing and said hub;

d) a second connector attached to said hub;

e) a ribbon cable carried in said radial space and having a first end connected to first connector and a second end connected to said second connector; and f) a carrier apparatus, resiliently clamped onto said hub, said carrier apparatus consisting of a unitary member having a clamping portion for pressing said ribbon cable against said hub so that in a state where said ribbon cable is wrapped on said hub it may not expand away from said hub a distance more the combined thickness of said wrapped cables and an integral semi-circular shaped brace for guiding the ribbon cable.

12. The clockspring assembly of claim 11, wherein said distance is less than 0.100 inch.

* * * * *